April 25, 1950          J. R. CLARK ET AL          2,505,604
DROPPABLE WING TIP TANK Filed Feb. 1, 1947          3 Sheets-Sheet 1

INVENTORS
J. R. Clark
D. L. McFarland
BY
M. B. Tasker
ATTORNEY

April 25, 1950  J. R. CLARK ET AL  2,505,604
DROPPABLE WING TIP TANK

Filed Feb. 1, 1947  3 Sheets-Sheet 2

INVENTORS
J. R. Clark
D. L. McFarland
BY
M. B. Tasker
ATTORNEY

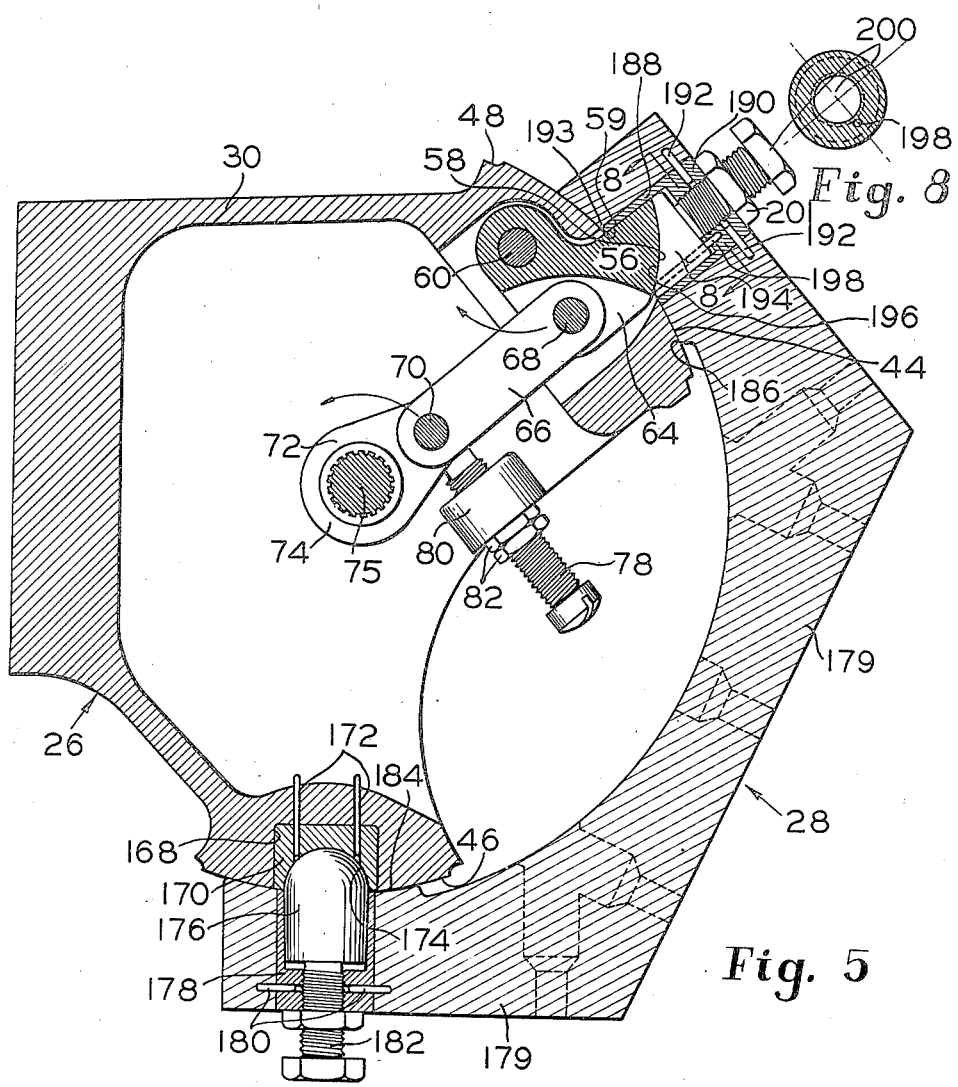
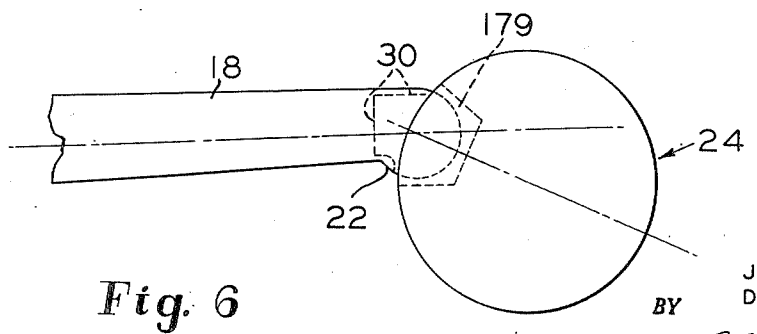

Patented Apr. 25, 1950

2,505,604

UNITED STATES PATENT OFFICE 2,505,604

DROPPABLE WING-TIP TANK

John R. Clark, Stratford, and Donald L. McFarland, Milford, Conn., assignors to United Aircraft Corporation, East Hartford, Conn., a corporation of Delaware Application February 1, 1947, Serial No. 725,902

7 Claims. (Cl. 244—135)

This invention relates to aircraft and particularly to aircraft having droppable fuel tanks or the like.

It is an object of this invention to provide a droppable auxiliary fuel tank or other disposable unit, and particularly to provide improved disposable units of this type which are releasably attached to the wing tips of the aircraft.

Another object of the invention is to provide improved attaching and releasing mechanism for such a disposable unit.

A further object is the provision of means for separately controlling the mechanism for attaching each of a plurality of such units and for jointly controlling said mechanisms to effect the simultaneous release of all the units.

Another object of the invention is the provision of means for securing droppable fuel tanks rigidly yet releasably to the wing tips of an airplane.

A still further object of the invention is generally to improve the construction and operation of aircraft.

These and other objects and advantages of the invention will become apparent from the claims and from the following detailed description of the accompanying drawings which show a preferred embodiment of the invention.

In these drawings:

Fig. 3 is a perspective view of the cooperating tank attaching and releasing mechanisms associated with the wing tip and tank structures;

Fig. 5 is a section taken on line 5—5 of Fig. 3 showing the mechanisms in the tank attached position;

Fig. 6 is a somewhat diagrammatic front view of one of the wing tips with a droppable fuel tank in position thereon;

Fig. 7 is a detailed perspective view of the pilot operated controls for the tank attaching and releasing mechanisms;

Fig. 8 is a section on line 8—8 of Fig. 5; and

Figure 1:
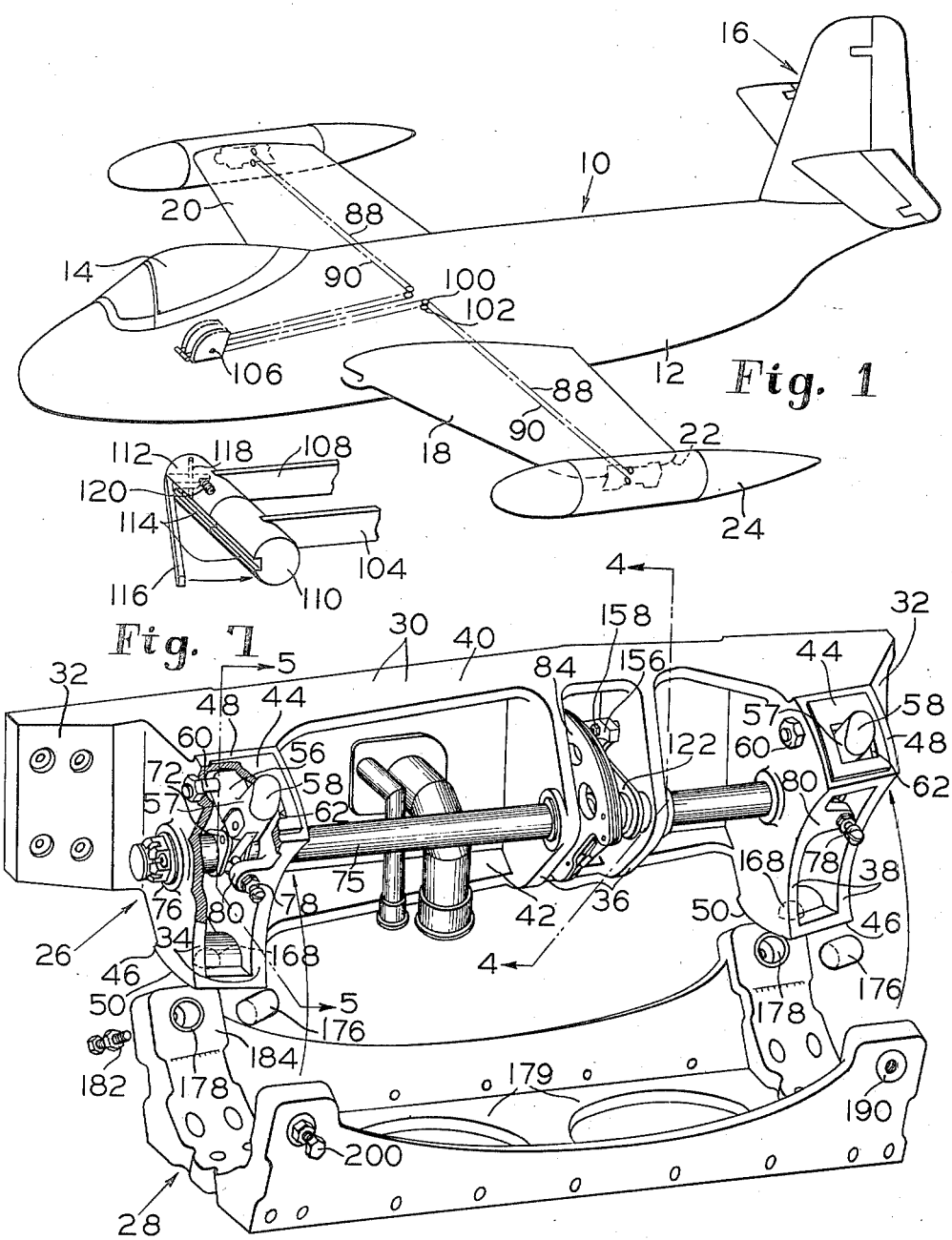
Fig. 1 is a perspective view of an airplane equipped with the improved droppable wing tip fuel tanks of this invention.

As herein shown, an airplane generally indicated at 10 has a fuselage 12 having the pilot compartment 14, empennage 16 and oppositely extended wings 18 and 20 on the tips 22 of which droppable fuel tanks 24 are releasably and interchangeably supported.

The drop tank mounting and releasing mechanism of this invention is used to its fullest advantage on a wing tip of the type shown herein, but obviously can be used on wing tips of other designs. The wing tips 22 as herein shown are formed by revolving the upper camber line of a cross section of the wing taken at the tip of the outer panel around the chord line of the wing at said section until it intersects the under surface of the outer panel to form a surface of revolution which is receivable in a well formed in the drop tank to be supported thereon. When in position on the wing tip, the tank encloses a little more than 180° of the periphery of the wing tip as shown most clearly in Fig. 6. This construction is described in detail and claimed in a co-pending application, Serial No. 725,439, filed January 31, 1947, and assigned to the assignee of this application.

The supporting and locking devices for the tanks 24, which are identical, each includes two cooperating mechanisms, one of which is generally indicated by the numeral 26 and is secured to the wing beam (not shown) wholly within the shell of the wing tip 22, and the other of which is indicated generally by the numeral 28 and is fastened in the well of the drop tank to suitable ribs (not shown) therein. These mechanisms are shown in Fig. 3 detached from their supporting structure in the relative positions which they assume just prior to securing a tank 24 to the wing tip.

Figure 2:
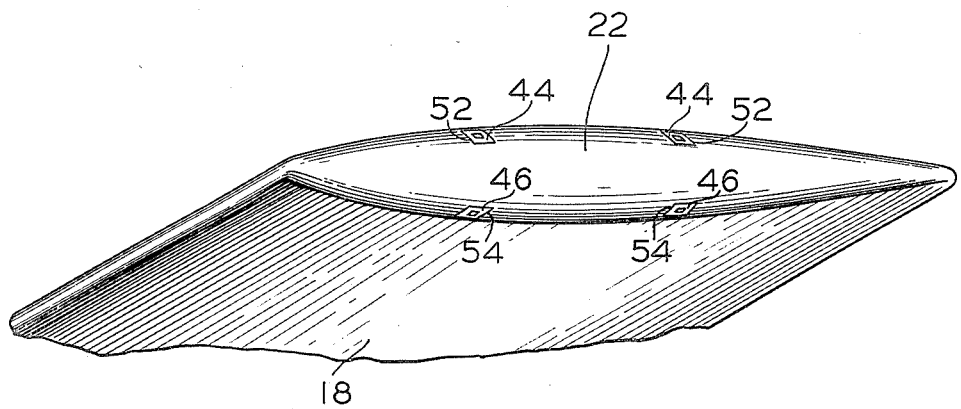
Fig. 2 is a similar view on a larger scale of one of the wing tips.

Mechanism 26 includes a casting 30 having lugs 32 at its opposite ends through which suitable fastenings are extended into the wing beam to secure the mechanism rigidly and permanently in place in the wing tip. The casting 30 is formed with three pairs of outwardly extending webs 34, 36 and 38 which are joined by upper and lower stiffening flanges 40 and 42 to provide an integral supporting structure for the locking mechanism. The webs 34 and 38 which are disposed adjacent the ends of the casting are provided with upper and lower arcuate faced rectangular pads 44 and 46 which extend above arcuate surfaces 48 and 50 that merge into flanges 40 and 42 respectively. The pads 44 and 46 upstand above said arcuate surfaces 48 and 50 an amount which equals the thickness of the shell of the wing tips 22 and these pads extend through upper and lower rectangular openings 52 and 54 ain the wing tip shell, as is shown most clearly in Fig. 2, with the shell supported on the arcuate surfaces 48 and 50 therebeneath and the pads conforming to the curvature of the wing tip surface.

Bell crank shaped latches 56 having cylindrical latch plungers 57 terminating in arcuate end faces 58 are pivoted on the bolts 60 between said pairs of webs 34 and 38 and these plungers project through openings 62 in the pads 44 so that their latch faces 59 can cooperate with suitable latch engaging recesses, hereinafter to be described, in mechanism 28 in a tank 24.

Each latch 56 has a kerf 64 cut therein to receive one end of a latch operating link 66 which is pivoted to the latch on a pin 68. The other end of link 66 is pivoted on a pin 70 between a pair of arms 72 of a bushing 74 which is splined to an operating shaft 75 journaled in webs 34, 36 and 38. Shaft 75 is held against axial displacement in casting 30 by suitable nuts 76, one of which is shown in Fig. 3.

It will be evident that counterclockwise rotation of shaft 75, as viewed in Fig. 5, will break the toggle comprising arm 72 and link 66 which, in the latch projected position, is in fully straightened position. A stop is provided to engage the toggle joint and limit the clockwise rotation of bushing 74 and arms 72 beyond the toggle straightened position shown in Fig. 5, comprising a cap screw 78 threaded into a boss 80 and held in adjusted position by lock nuts 82.

Means controlled by the pilot is provided for rotating the shaft 75 in a counterclockwise direction, as viewed in Fig. 5, to break the toggles for the two latches 56 and cause the latch faces thereof to be withdrawn beneath the arcuate surfaces of pads 44. To this end a cable sector pulley 84 is rotatably mounted on a bushing 86 which is splined to shaft 75. Cables 88 and 90 extend around opposite sides of the sector pulley and are secured thereto at 92 and 94 respectively. These cables pass between opposed guide pulleys 96 and 98 and over pulleys 100 and 102, amidship of the airplane, and thence forward to a pilot's control lever 104 which is pivoted at 106 in a suitable support. Similar cables from the other wing of the airplane are connected to a parallel pilot's control vere 108 and the two levers 104 and 108 terminate in aligned hand grips 110 and 112. The hand grips are provided with aligned grooves 114 (Fig. 7) adapted to receive a bar 116 which is pivoted at one end on a pin 118 in the grip 112. Bar 116 is constantly biased by spring 120 into the grooves 114 to lock the hand grips 110 and 112 together for joint operation. By swinging the bar 116 into the position shown in Fig. 7, however, either lever 104 or 108 can be operated separately.

At one side of pulley 84 and between this pulley and the adjacent web 36 is mounted a bifurcated arm 122 having its hub splined to shaft 75. Between the furcations of arm 122 two ears 124 and 126 are mounted on pivots 128 and 130 respectively. Ears 124 and 126 have parallel tails 132 and 134 provided with confronting spring locating pins for positioning the opposite ends of a compression spring 136 which constantly biases the parallel confronting faces 138 and 140 on the opposite ends of these ears into engagement with a pin 142 carried by pulley 84. The pin 142 operates in a notch in arm 122 between parallel opposed faces 144 and 146 which are more widely spaced than surfaces 138 and 140 on the ears 124 and 126, thus permitting the pin 142 to move the ears about their pivots a short distance before it engages and is stopped by one of the surfaces 144 or 146 of arm 122. Ears 124 and 126 are also provided with locking faces 148 and 150 respectively which cooperate in the normal position of the part shown in Fig. 4 with abutment faces 152 and 154 on a generally arcuate abutment member 156 rigidly secured to one of the webs 36 by bolts 158. The locking faces 148, 150 and the abutment faces 152, 154 are arcuate, being struck about the pivots 128, 130 of ears 138, 140 in the position of the arm 122 shown in Fig. 4. The ends of ears 124, 126, between the locking faces 148 and 150 thereof, are arcuate in configuration and conform to the arcuate inner face 160 of abutment member 156. A similar arcuate surface 162 is provided on member 156 between abutments 164 and 166, similar to abutments 152 and 154 above described and these abutments 164, 166 cooperate with surfaces 148 and 150 on ears 124, 126 to lock arm 122 in its other extreme position in which latches 56 are withdrawn beneath the surfaces of pads 44. It will be evident that when the locking faces 148, 150 are in engagement with either pair of abutments 152, 154 or 164, 166 the arm 122, shaft 75 and hence the toggle mechanism for operating latches 56 are all locked and remain locked until pulley 84 has been moved through a sufficient angular distance to cause pin 142 to move one or the other of ears 138, 140 to release arm 122.

The pads 46 are provided with circular recesses 168 which are best shown in Fig. 5 for the reception of locking pins carried by mechanism 28 secured in the well of tank 24. Recesses 168 receive plugs 170 which are permanently staked into the casting 30 by pins 172. The plugs 170 have hemispherical sockets 174 therein which receive the rounded ends of generally cylindrical pins 176 carrier by mechanism 28. The plugs 176 are axially slidable in bushings 178 secured in the casting 179 of mechanism 28 by radial stakes 180. Bushings 178 have axial screws 182 threaded therein for engaging the pins 176 and adjusting them axially in bushings 178 so that the tank can be secured rigidly in place following installation on the wing tip. Casting 179 has a pair of arcuate surfaced pads 184, which engage and conform to pads 46, through which pins 176 project and also has a similar pair of pads 186 which engage and conform to pads 44 on casting 30. The pads 186 have apertures 188 provided with bushings 190 fixed therein by radial stakes 192. Bushings 190 have recesses 193 containing plugs 194 having arcuate end faces 196 which conform to the end faces 58 of the latches 56. The plugs 194 are each fixed against rotation in bushings 190 by a stake 198. Axial adjusting screws 200 are threaded into bushings 190 and engage the plugs 194 and adjust them relative to the end faces 58 of latch plungers 57 in which position the screws 200 are held by lock nuts 201.

Figure 4:
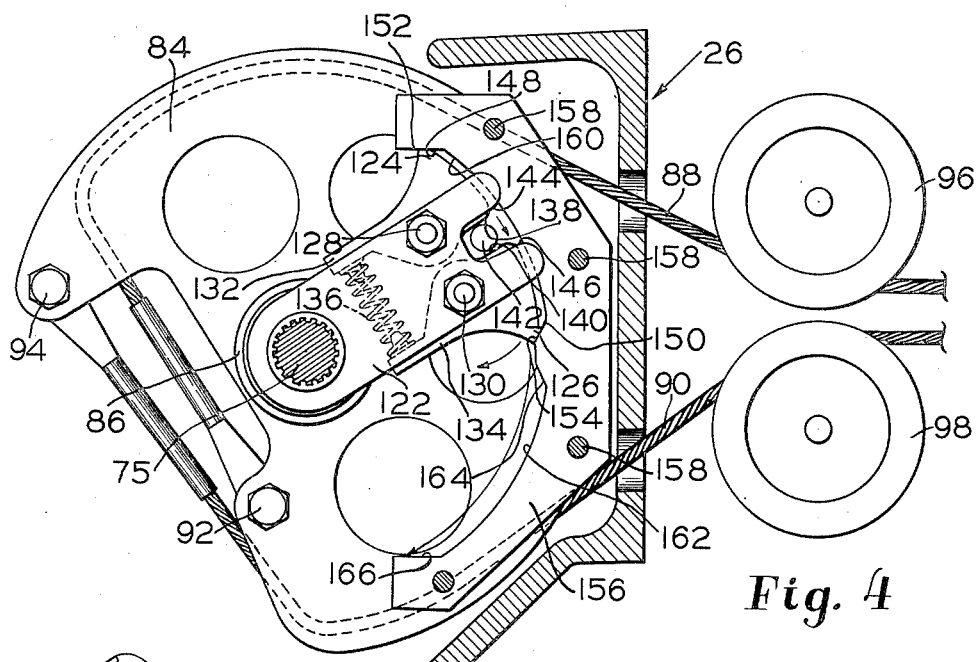
Fig. 4 is a section taken on line 4—4 of Fig. 3.
Figure 9:
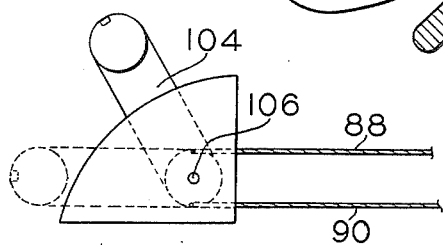
Fig. 9 is an enlarged view showing the control cable connections to the drop tank release handles.

When it is desired to attach drop tanks 24 to the wing tips 22, the control arms 104, 108 are moved to exert a pull on cables 88 to rotate pulleys 84 of each of the wing tip mechanisms 26 in a clockwise direction as viewed in Fig. 4. The pin 142 carried by pulley 84 will move ear 140 clockwise about its pivot 130 permitting the locking face 150 to pass over abutment face 154 as the pin 142 continues its clockwise movement. As soon as pin 142 engages face 146 of arm 122 the shaft 75 will be rotated in a clockwise direction, as viewed in Fig. 4, or in a counterclockwise direction as viewed in Fig. 5, to break the toggle 72, 66 and withdraw the latches 56 beneath the surfaces of pads 44.

Considering Figs. 3 and 5, the method of attachment of a tank 24 to a wing tip 22 following the withdrawal of latches 56 will be evident. First pins 176 are placed in bushings 178 of casting 179 and the rounded projecting ends of these pins are inserted in sockets 174 in plugs 170 of castings 30. The rounded ends of these pins then act as pivot points about which the tank is swung inboard at the top until the apertures in bushings 190 are in register with apertures 62 in pads 44. The left-hand control lever 104 is now freed from its connections with lever 108 by swinging the bar 116 out of the groove 114, and this lever 104 is swung upward to exert a pull on cable 90 which will move the arm 122 counter-clockwise as viewed in Fig. 4 into the position shown in this figure in which the toggle 72, 66 is straightened and the latches 56 are projected into the recesses 193 in bushings 190 with the latch faces 59 thereof in engagement with the inner wall of the bushing 190. The adjusting screws 200 at the top of the tank are then screwed down to bring the plugs 194 into clamping engagement with the arcuate end faces 58 of latches 56, and the adjusting screws 182 are similarly axially adjusted to urge the pins 176 against the socketed plugs 170 to clamp the tank firmly in place on the wing tip structure. Access to the adjusting screws 182 and 200 is obtained through the usual panels provided in the shell of the tank housing.

In accordance with this invention the tank supporting and releasing mechanism is constructed and arranged so that the tanks 24 on the left and right wing tips are interchangeable. To this end the latch plungers of latch members 56 are of circular cross section and are of the same size as the pins 176 and the recesses 178 and 193 in bushings 178 and 190 are identical. It will be evident from Fig. 3 that if the tank carried by casting 179 were to be placed on the wing tip of the opposite wing of the airplane, by bodily rotation of this tank over the top of the airplane the apertures 193 in bushings 190 would then receive the pins 176 and would become the lower pivot points previously described, while the bushings 178 would engage the latches 56.

When the pilot wants to release the tanks in flight he merely operates the two hand grips 110 and 112 to swing control levers 104, 108 downward and break the toggles 72, 66 which withdraws latches 56 from bushings 190 of both mechanisms 28. Although when the tanks are installed the plugs 194 are adjusted by screws 200 to bear firmly against latches 56 supported by the locked toggles 72, 66, breaking of toggles 72, 66 withdraws the latches from abutting engagement with plugs 194 and also withdraws the latches from bushings 190. The tanks then swing outwardly and downwardly away from the wing tips without danger of interference with the latter. Since the hand grip 110, 112 are locked together by the bar 116 the release of the two tanks will be simultaneous.

It will be evident that by this invention a simple and reliable drop tank supporting and releasing mechanism has been provided which not only greatly facilitates the attachment and the release of such tanks, but also enables the left and right-hand wing tip tanks to be exchangeable.

It will further be evident that the releasing means provided insure safe disposal of a drop tank without danger of interference with the airplane and that accurately timed simultaneous disposal of the tank carried by the opposite wing is insured.

While only one embodiment of the invention has been shown and described herein, it will be evident that various changes may be made in the construction and arrangement of the parts without departing from the scope of the invention as defined in the following claims.

We claim:

1. An airplane having wings, disposable units adapted to be carried by the tips of said wings, each of said units having a well therein in which either of said wing tips is receivable, cooperating mechanisms carried by said wing tips and said units for releasably securing either of the latter on either of said wing tips, said wing tip carried mechanism having sockets below the median plane of said wing and latches projecting beyond the surface of said wing above the median plane thereof, said unit carried mechanism having lower apertures aligned with said sockets and upper apertures aligned with said latches, said latches receivable in either said upper or said lower apertures, pins insertable in either said upper or said lower apertures having projections receivable in said sockets, and pilot operated means operable while said projections are seated in said sockets for projecting and retracting said latches.

2. An airplane having wings, disposable units adapted to be carried by the tips of said wings said units having wells therein in which the wing tips are receivable, cooperating mechanisms carried by said wing tips and said units for releasably securing either unit on either of said wing tips in the same fore and aft position relative to said wings, said wing tip carried mechanisms having sockets below the median planes of said wings and latches projecting beyond the upper surfaces of said wings, and said unit carried mechanisms including upper apertured members located in said wells in position to receive said latches and lower apertured members located in said wells in register with said sockets, pivot pins receivable in the apertures in said lower apertured members having their ends seated in said sockets, said pins also being receivable in the apertures in said upper apertured members and said latches being receivable in the apertures in said lower aperture members, whereby said units are interchangeable.

3. An airplane having a wing, a disposable unit carried by the tip of said wing, said unit having a well therein adapted to enclose a portion of said wing tip, means for releasably connecting said unit to said wing tip including a recess in the surface of said well above the median plane of said wing, a latch member on said wing tip adapted to be projected into said recess, a toggle having one end connected to said latch and adapted when straightened to project said latch into said recess, pilot controlled mechanism for operating said toggle between its straightened and broken positions, said pilot controlled mechanism including a pilot actuated member, a member connected to said toggle and having a lost motion connection with said pilot actuated member, means carried by said toggle connected member for normally maintaining said toggle in its straightened position, and means carried by said pilot actuated member for releasing said toggle maintaining means to break said toggle and withdraw said latch member from its projected position.

4. An airplane having wings, disposable units carried by the tips of said wings having airfoil shapes including leading and trailing configurations, each of said units having a well therein adapted to receive a portion of a wing tip, means for mounting said units interchangeably on said wing tips including pairs of projections and mating recesses on the overlapping walls of said wing tips and wells both above and below the median planes of said wings, said projections and recesses being so constructed and arranged that any projection is receivable in any recess, whereby either unit can be mounted in the same fore and aft position on either wing tip of the airplane.

5. An airplane having a wing, a disposable unit carried by the tip of said wing having a well therein adapted to enclose a portion of said wing tip, means for releasably connecting said unit to said wing tip including a latch carried by the latter above the median plane of said wing, pilot actuated means for operating said latch including a shaft journaled in said wing tip, an actuating member journaled on said shaft, a latch operating toggle including an arm on said shaft and a pivoted link connected to said arm and latch, a second arm secured to said shaft having opposed abutment surfaces therein, a projection on said actuating member located between said abutments providing a lost motion connection between said actuating member and said second arm, a pair of ears pivoted on said second arm having opposed abutment faces on opposite sides of said projection and between said abutment surfaces whereby said ears are engaged by said projection and rocked about their pivots prior to the engagement of said projection with said abutments, said ears having locking shoulders, fixed abutments cooperating with said shoulders, and means including a pilot operated member for moving said actuating member in opposite directions for unlocking said latch operating toggle and moving the latter between its straightened and broken positions to connect and release said unit.

6. An airplane having a wing, a disposable unit carried by the tip of said wing having a well therein adapted to enclose a portion of said wing tip, mechanism for releasably connecting said unit to said wing tip including a pivotal support between said wing tip and unit located below the median plane of said wing and a latch carried by said wing above said plane for engaging said unit, latch operating mechanism for projecting and retracting said latch, means for normally locking said latch operating mechanism, a pilot operated member for actuating said latch operating mechanism having a lost motion connection with said latch operating mechanism, and means operative as a result of the movement of said pilot operated member relative to said latch operating mechanism for unlocking said locking means.

7. An airplane having a wing, a disposable unit carried by the tip of said wing having a well therein adapted to enclose a portion of said wing tip, mechanism for releasably connecting said unit to said wing tip including a pivotal support between said wing tip and unit located below the median plane of said wing and a releasable latch carried by said wing tip above said plane and cooperating with a latch engaging member carried by said unit, latch operating mechanism carried by said wing including a pivoted shaft and a member mounted on said shaft, a pilot operated actuating member, cooperating locking members, one pivotally mounted on said shaft mounted member and the other carried by fixed structure of said wing, means providing a lost motion connection between said shaft mounted member and said actuating member, and means operative upon movement of said actuating member by the pilot for moving said pivoted locking member to unlock said latch operating mechanism prior to engagement of said actuating member with said shaft mounted member.

JOHN R. CLARK.
DONALD L. McFARLAND.

REFERENCES CITED

The following references are of record in the file of this patent:

UNITED STATES PATENTS

| Number | Name | Date |
|---|---|---|
| 1,584,358 | Dement | May 11, 1926 |
| 2,416,104 | Lerche | Feb. 18, 1947 |
| 2,421,699 | Johnson | June 3, 1947 |

FOREIGN PATENTS

| Number | Country | Date |
|---|---|---|
| 292,513 | Great Britain | Dec. 13, 1928 |